United States Patent
Rashid

(10) Patent No.: US 11,124,633 B2
(45) Date of Patent: Sep. 21, 2021

(54) ALL TEMPERATURE WATER BORNE SEALANT

(71) Applicant: Red Devil, Inc., Tulsa, OK (US)

(72) Inventor: Ali N. Rashid, Tulsa, OK (US)

(73) Assignee: Red Devil, Inc., Tulsa, OK (US)

( * ) Notice: Subject to any disclaimer, the term of this patent is extended or adjusted under 35 U.S.C. 154(b) by 197 days.

(21) Appl. No.: 16/254,969

(22) Filed: Jan. 23, 2019

(65) Prior Publication Data

US 2019/0390044 A1    Dec. 26, 2019

Related U.S. Application Data

(60) Provisional application No. 62/689,680, filed on Jun. 25, 2018.

(51) Int. Cl.
     *C08L 13/02*      (2006.01)
     *C09K 3/10*      (2006.01)

(52) U.S. Cl.
CPC ........... *C08L 13/02* (2013.01); *C09K 3/10* (2013.01); *C08L 2201/52* (2013.01); *C08L 2205/03* (2013.01); *C09K 2200/0234* (2013.01); *C09K 2200/0429* (2013.01); *C09K 2200/0441* (2013.01); *C09K 2200/0482* (2013.01); *C09K 2200/0607* (2013.01); *C09K 2200/0625* (2013.01)

(58) Field of Classification Search
CPC .. C08L 13/02; C08L 2201/52; C08L 2205/03; C09K 3/10; C09K 2200/0625; C09K 2200/0441; C09K 2200/0482; C09K 2200/0234; C09K 2200/0607; C09K 2200/0429

See application file for complete search history.

(56) References Cited

U.S. PATENT DOCUMENTS

| | | | | |
|---|---|---|---|---|
| 5,216,057 A | * | 6/1993 | Pratt | C09K 3/1018 524/262 |
| 6,333,365 B1 | * | 12/2001 | Lucas | C08J 9/141 521/78 |
| 7,308,938 B1 | * | 12/2007 | Chatterji | C04B 28/02 166/279 |
| 2002/0061940 A1 | * | 5/2002 | Lach | C09D 133/062 523/160 |
| 2005/0192383 A1 | * | 9/2005 | Bloom | C09D 5/04 524/55 |
| 2007/0111900 A1 | * | 5/2007 | Reddy | C09K 8/32 507/221 |
| 2011/0077348 A1 | * | 3/2011 | Erdem | C08G 18/4891 524/539 |

FOREIGN PATENT DOCUMENTS

GB      318562 A   *   9/1929  ............. B01F 17/00

OTHER PUBLICATIONS

Tamol 901 Technical Data Sheet (Year: 2020).*
Triton X 405 Technical Data Sheet (Year: 2020).*

* cited by examiner

*Primary Examiner* — Angela C Scott
(74) *Attorney, Agent, or Firm* — David Guerra

(57) ABSTRACT

A wide temperature water borne sealant that can be applied at low temperatures. The sealant can be a latex sealant composition including at least one latex polymer, at least one freeze thaw stabilizer, and at least one peptone or at least one additive derived from a peptone. The latex polymer can be an acrylic latex polymer with a Glass Transition Temperature (Tg) of 0° C. or less. The peptone can be enzymatic hydrolysate. The sealant can remain pliable at low temperatures making it ideal for applications that require flexibility at low temperatures its' rheology and viscosity are such that it can be applied at temperatures below 0° C. The low Tg latex assures that the sealant will remain permanently flexible and non-tacky when cured, and the peptone provides the sealant with the means to prevent the water from freezing down to approximately −20° C.

20 Claims, No Drawings

ALL TEMPERATURE WATER BORNE SEALANT

CROSS-REFERENCE TO RELATED APPLICATION

This application claims the benefit of priority under 35 U.S.C. § 119(e) based upon U.S. provisional patent application Ser. No. 62/689,680 filed on Jun. 25, 2018. The entire disclosure of the prior provisional application is incorporated herein by reference.

BACKGROUND

Technical Field

The present technology relates to a wide temperature water borne sealant for use in connection with a water-based latex sealant that can be applied at low temperatures to replace the use of solvent based sealants.

Background Description

The use of solvent or water based sealants is known in the prior art. These solvent based sealants are made with solvents that may be toxic, and in some instances, the solvents used may be carcinogenic (as is the case for tert-butyl acetate). In addition increased government regulation and heightened consumer awareness has put increased pressure on the manufacturers of solvent based sealants to reduce the volatile organic compound (VOC) content in the products.

A problem that has persisted for the development of water-based formulations for low temperature sealant applications has been the inability of the sealant to maintain adequate physical properties (rheology and viscosity) while still curing at temperatures below the freezing point of water (0° C./32° F.).

While the above-described devices fulfill their respective, particular objectives and requirements, the aforementioned patents do not describe an wide temperature water borne sealant that allows a water-based latex sealant that can be applied at low temperatures to replace the use of solvent based sealants.

Therefore, a need exists for a new and novel wide temperature water borne sealant that can be used for a water-based latex sealant that can be applied at low temperatures to replace the use of solvent based sealants. In this regard, the present technology substantially fulfills this need. In this respect, the wide temperature water borne sealant according to the present technology substantially departs from the conventional concepts and designs of the prior art, and in doing so provides an composition primarily developed for the purpose of a water-based latex sealant that can be applied at low temperatures to replace the use of solvent based sealants.

BRIEF SUMMARY OF THE PRESENT TECHNOLOGY

In view of the foregoing disadvantages inherent in the known types of solvent based sealants now present in the prior art, the present technology provides a novel wide temperature water borne sealant composition, and overcomes the above-mentioned disadvantages and drawbacks of the prior art. As such, the general purpose of the present technology, which will be described subsequently in greater detail, is to provide a new and novel wide temperature water borne sealant and method which has all the advantages of the prior art mentioned heretofore and many novel features that result in an wide temperature water borne sealant which is not anticipated, rendered obvious, suggested, or even implied by the prior art, either alone or in any combination thereof.

According to one aspect of the present technology, the latex sealant composition essentially includes at least one latex polymer, at least one freeze thaw stabilizer, and at least one peptone or at least one additive derived from a peptone.

According to another aspect of the present technology, the latex sealant composition essentially includes at least one defoamer, at least one latex polymer, at least one biocide, at least one surfactant, at least one freeze thaw stabilizer, at least one dispersing aid, at least one enzymatic hydrolysate peptone or at least one additive derived from an enzymatic hydrolysate peptone, at least one pigment, at least one filler, and at least one thickener.

According to yet another aspect of the present technology, the latex sealant composition essentially includes at least one water-based and non-silicone antifoam agent, at least one acrylic latex polymer with a Glass Transition Temperature (Tg) of 0° C. or less, Mergal® 758, Polyphase® 678, octylphenol ethoxylate, propylene glycol, tripolyphosphate or tetrapotassium pyrophosphate, collagen peptide, at least one pigment, ground marble, and a polyacrylate thickener.

According to yet another aspect of the present technology, the latex sealant composition essentially includes HL-52, Rhoplex™ 4400, Mergal® 758, Polyphase® 678, Triton™ x405, propylene glycol, potassium tripolyphosphate (KTPP) or Tetrapotassium pyrophosphate (TKPP), gelatine hydrolysate enzymatic, W-7016 Black, Tamol™ 851, Drikalite®, and Paragum® 500.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel wide temperature water borne sealant that has all of the advantages of the prior art solvent based sealants and none of the disadvantages.

It is another object of the present technology to provide a new and novel wide temperature water borne sealant that may be easily and efficiently manufactured and marketed.

An even further object of the present technology is to provide a new and novel wide temperature water borne sealant that has a low cost of manufacture with regard to both materials and labor, and which accordingly is then susceptible of low prices of sale to the consuming public, thereby making such wide temperature water borne sealant economically available to the buying public.

Still another object of the present technology is to provide a new wide temperature water borne sealant that provides in the apparatuses and methods of the prior art some of the advantages thereof, while simultaneously overcoming some of the disadvantages normally associated therewith.

Even still another object of the present technology is to provide an wide temperature water borne sealant for a water-based sealant that can be applied at low temperatures to replace the use of solvent based sealants. This allows for a water-based latex sealant that can be applied at low temperatures. The sealant not only remains pliable at low temperatures making it ideal for applications that require flexibility at low temperatures its' rheology and viscosity are such that it can be applied at temperatures below 0° C.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

DETAILED DESCRIPTION OF THE PREFERRED EMBODIMENTS

The present technology relates to embodiments of an wide temperature water borne sealant composition formulated with a latex emulsion that has a Glass Transition Temperature (Tg) less than or equal to 0° C., preferably less than or equal to −20° C., and an additive derived from an enzymatic hydrolysate peptone.

The present disclosure describes a water-based latex sealant that can be applied at low temperatures. The sealant can remain pliable at low temperatures making it ideal for applications that require flexibility at low temperatures its' rheology and viscosity are such that it can be applied at temperatures below 0° C.

The present technology composition is formulated with a latex emulsion that has a Tg less than or equal to 0° C., preferably less than or equal to −20° C., and an additive derived from an enzymatic hydrolysate peptone. The low Tg latex assures that the sealant will remain permanently flexible and non-tacky when cured, and the peptone provides the sealant with the means to prevent the water from freezing down to approximately −20° C.

The present technology composition can include at least one defoamer, a low Tg Latex Polymer, a biocide, a surfactant, a freeze thaw stabilizer, a dispersing aid, an enzymatic hydrolysate peptone, a pigment, a dispersing agent, a filler and a thickener.

1. Defoamers

In one embodiment of the present technology, the composition can include at least one defoamer or anti-foaming agent. Defoamers or anti-foaming agents are chemical additives that reduce and hinder the formation of foam in industrial process liquids. The terms anti-foam agent and defoamer can be used interchangeably. Commonly used defoaming agents are insoluble oils, polydimethylsiloxanes and other silicones, certain alcohols, stearates and glycols. The defoamer is used to prevent formation of foam or is added to break foam already formed.

In industrial processes, foams pose serious problems. They cause defects on surface coatings and prevent the efficient filling of containers. A variety of chemical formulae is available to prevent formation of foams.

An example of a water based defoamer that can be utilized in the present technology composition is antifoam HL-52 by Hangzhou Harmony Chemical Co., Ltd., which is a 100% mineral water-based non-silicone antifoam agent. Antifoam HL-52 is a non-silicone 100% active defoamer designed to be as effective as silicone-based defoamers.

Optional examples of defoamers that can be utilized in the present technology include, but not limited to, Alkyl poly acrylates, Castor Oil, Fatty Acids, Fatty Acids Esters, Fatty Acids Sulfate, Fatty Alcohol, Fatty Alcohol Esters, Fatty Alcohol Sulfate, Foot Olive Oil, Mono & Di Glyceride, Paraffin Oil, Paraffin Wax, Poly Propylene Glycol, Silicones Oil, Vegetable & Animal Fats, Vegetable & Animal Fats Sulfate, Vegetable & Animal Oil, Vegetable & Animal Oil Sulfate, Vegetable & Animal Wax, Vegetable & Animal Wax Sulfate, AWABREAK G-109, AWABREAK PO-20, Alginates, salts of alginic acid, Andifoam DF 210FGK AB, Andifoam DF 220FGK AB, Andifoam DF 230FGK AB, Andifoam DFA 100M FGK AB, Andisil® EM 350 FGK AB, Andisil® EM 350C FGK AB, Blandol® White Mineral Oil, Carnation® White Mineral Oil, DOWSIL™ AFE-1520, DREWMULSE GMO (Glyceryl Monooleate), Durem™ 300, GLORIA® White Mineral Oil, GRINDSTED® Acetem 90-50, HopAid® Antifoam, I-MUL 300, I-MUL GMO, I-MUL GMO 40, I-MUL GMO K, I-MUL GMO—F, I-MUL PGE 32, I-MUL PGO 1010, I-MUL PGO 104, I-MUL PGO 31, KAYDOL® White Mineral Oil, KLEAROL® White Mineral Oil, Nu-FLOW®, Pinnacle™ 170 Petrolatum, Pinnacle™ 190 Petrolatum, Pinnacle™ 225 Petrolatum, Pinnacle™ LC 170 Petrolatum, Pinnacle™ LC 190 Petrolatum, Pinnacle™ LC 225 Petrolatum, Pinnacle™ WF 170 Petrolatum, Pinnacle™ WF 190 Petrolatum, Pinnacle™ WF 225 Petrolatum, Polyethylene Glycol 1000 NF, Polyethylene Glycol 200, Polyethylene Glycol 300, Polyethylene Glycol 3350 NF, Polyethylene Glycol 400 USP/NF/FCC, Polyethylene Glycol 4500 NF, Polyethylene Glycol 600 USP/NF/FCC, SILFAR® 1000, SILFAR® 350, SILFAR® 500, SILFAR® S 184, SILFAR® SE 4, SILRES® HK 46, XFO-100S, XFO-10S, XFO-20S, XFO-30S, XIAMETER™ ACP-1500, XIAMETER™ ACP-1920, XIAMETER™ AFE-0100, XIAMETER™ AFE-0300, XIAMETER™ AFE-1510, XIAMETER™ AFE-1520, oil based defoamers, powder defoamers, water based defoamers, silicone based defoamers, EO/PO based defoamers, alkyl polyacrylates, combinations thereof, and the like.

Oil based defoamers have an oil carrier. The oil might be mineral oil, vegetable oil, white oil or any other oil that is insoluble in the foaming medium, except silicone oil. An oil based defoamer also contains a wax and/or hydrophobic silica to boost the performance. Typical waxes are ethylene bis stearamide (EBS), paraffin waxes, ester waxes and fatty alcohol waxes. These products might also have surfactants to improve emulsification and spreading in the foaming medium.

Powder defoamers are in principle oil based defoamers on a particulate carrier like silica.

Water based defoamers are different types of oils and waxes dispersed in a water base. The oils are often mineral oil or vegetable oils and the waxes are long chain fatty alcohol, fatty acid soaps or esters.

Silicone-based defoamers are polymers with silicon backbones. These might be delivered as an oil or a water based emulsion. The silicone compound consists of an hydrophobic silica dispersed in a silicone oil. Emulsifiers are added to ensure that the silicone spreads fast and well in the foaming medium. The silicone compound might also contain silicone glycols and other modified silicone fluids.

Polydimethylsiloxane is a widely used antifoaming agent.

EO/PO based defoamers contain polyethylene glycol and polypropylene glycol copolymers. They are delivered as oils, water solutions, or water based emulsions.

Alkyl polyacrylates are suitable for use as defoamers in non-aqueous systems where air release is more important than the breakdown of surface foam. These defoamers are often delivered in a solvent carrier like petroleum distillates.

2. Low Glass Transition Temperature (Tg) Latex Polymers

In one embodiment of the present technology, the composition can include at least one latex or acrylic polymer/binder, preferably a low Tg polymer/binder. Polymers are composed of long, randomly entangled, chains of molecules. At low temperatures these chains are locked together and unable to move. The polymer feels hard and is relatively brittle. The addition of heat alters these molecular chains to become more mobile. Continuous application of heat makes the polymer more mobile, softer and more pliable. The temperature at which this happens is the "Glass Transition Temperature" or "Tg". This transition is not at a specific temperature, but a range. The Tg is signified by a change in heat capacity. In other words, it absorbs heat but rather than getting hotter the material goes through this change of state.

The low Tg latex polymer utilizing in the present technology is sufficient to allow that the sealant will remain permanently flexible and non-tacky when cured. An example of a low Tg latex polymer that can be utilized in the present technology is Rhoplex™ 4400 or Rhoplex™ 2620 emulsions by Dow, which are 100% acrylic latex polymers designed to provide wide formulation latitude for caulks and sealants.

Typical Properties of Rhoplex™ 4400 Include:

| Appearance | Milky white liquid |
|---|---|
| Solids content, % | 63 |
| Viscosity @ 25° C., cPs | 180 |
| pH | 4.5 |
| Density @ 25° C., lbs/gal | 8.6 |
| Glass transition temperature, Tg (onset), ° C. | −43 |

Typical Properties of Rhoplex™ 2620 Include:

| Appearance | Milky white liquid |
|---|---|
| Solids content, % | 62 |
| Viscosity @ 25° C., cPs | 200 |
| pH | 4.4 |
| Density @ 25° C., lbs/gal | 8.9 |
| Glass transition temperature, Tg (onset), ° C. | −26 |

Optional examples of low Tg polymers that can be utilized in the present technology include, but not limited to, Rhoplex™ 2620 by The Dow Chemical Company (Dow), Polyvinylidene fluoride (PVDF), Polypropylene (PP atactic), Polyvinyl fluoride (PVF), Polypropylene (PP isotactic), Poly-3-hydroxybutyrate (PHB), styrene-butadiene copolymer, Nipol SB lattices, latex of acrylonitrile butadiene copolymer, acrylate latex, carboxylated styrene butadiene, non-carboxylated styrene butadiene, Styrene Acrylic Polymers, Rovene®, BarrierPro®, Tylac® and combinations thereof.

3. Biocide

In one embodiment of the present technology, the composition can include at least one biocide and/or preservative. Biocides can be a substance or additive that destroys or inhibits the growth or activity of living organisms, and as such can be used as preservative.

An example of biocides that can be utilized in the present technology are Mergal® 758 and/or Polyphase® 678 both by the Troy Corporation. Mergal® 758 is a formaldehyde-free, VOC-free, broad-spectrum preservative for waterborne systems. Polyphase® 678 is a zero VOC, water dispersed fungistat for aqueous based material. It can be appreciated that other and/or additional biocides can be utilized in place of the above described, and biocides used in the present technology may be an in-can preservative or suitable replacement.

Optional examples of biocides that can be utilized in the present technology include, but not limited to, (+/−)-cis-4-[3-(p-tertbutylphenyl)-2-methylpropyl]-2,6-dimethylmorpholine (Fenpropimorph), (±)-5-amino-1-(2,6-dichloro-α,α, α,-trifluoro-p-tolyl)-4-trifluoromethylsulfinylpyrazole-3-carbonitrile (1:1) (Fipronil), (1,3,4,5,6,7-hexahydro-1,3-dioxo-2H-isoindol-2-yl)methyl(1R-trans)-2,2-dimethyl-3-(2-methylprop-1-enyl)cyclopropanecarboxylate (d-Tetramethrin), (13Z)-Hexadec-13-en-11-yn-1-yl acetate, (2E)-1-[(6-chloropyridin-3-yl)methyl]-N-nitroimidazolidin-2-imine (Imidacloprid), (2R,6aS,12aS)-1,2,6,6a, 12,12a-hexahydro-2-isopropenyl-8,9-dimethoxychromeno[3,4-b]furo[2,3-h]chromen-6-one (Rotenone), (2RS,3RS;2RS,3 SR)-2-(4-chlorophenyl)-3-cyclopropyl-1-(1H-1,2,4-triazol-1-yl)butan-2-ol, (3β,5Z,7E)-9,10-secocholesta-5,7,10(19)-trien-3-ol (Cholecalciferol), (9Z,12E)-tetradeca-9, 12-dien-1-yl acetate, (benzothiazol-2-ylthio)methyl thiocyanate (TCMTB), (benzyloxy)methanol, (E)-1-(2-Chloro-1,3-thiazol-5-ylmethyl)-3-methyl-2-nitroguanidine (Clothianidin), (ethylenedioxy)dimethanol, (RS)-3-Allyl-2-methyl-4-oxocyclopent-2-enyl(1R,3R)-2,2-dimethyl-3-(2-methylprop-1-enyl)-cyclopropanecarboxylate (mixture of 2 isomers 1R trans: 1R/S only 1:3) (Esbiothrin), (RS)-3-Allyl-2-methyl-4-oxocyclopent-2-enyl-(1R,3R;1R,3 S)-2,2-dimethyl-3-(2-methylprop-1-enyl)-cyclopropanecarboxylate (mixture of 4 isomers 1R trans, 1R:1R trans, 1S:1R cis, 1R:1R cis, 1S 4:4:1:1) (d-Allethrin), (RS)-4-hydroxy-3-(3-oxo-1-phenyl-butyl)coumarin (Warfarin), (RS)-α-cyano-3phenoxybenzyl-(1RS)-cis, trans-3-(2,2-dichlorovinyl)-2,2-dimethylcyclopropanecarboxylate (Cypermethrin), (S)-.alpha.-Cyano-3-phenoxybenzyl(S)-2-(4-chlorophenyl)-3-methylbutyrate (Esfenvalerate), (S)-α-cyano-3-phenoxybenzyl(1R,3R)-3-(2,2-dibromovinyl)-2,2-dimethylcyclopropane carboxylate (Deltamethrin), (Z)-3-(6-chloro-3-pyridylmethyl)-1,3-thiazolidin-2-ylidenecyanamide (Thiacloprid), .alpha., .alpha.', .alpha."-trimethyl-1,3,5-triazine-1,3,5(2H,4H,6H)-triethanol (HPT), .alpha.-cyano-3-phenoxybenzyl 2,2-dimethyl-3-(2-methylprop-1-enyl)cyclopropanecarboxylate (Cyphenothrin), .alpha.-cyano-4-fluoro-3-phenoxybenzyl 3-(2,2-dichlorovinyl)-2,2-dimethylcyclopropanecarboxylate (Cyfluthrin), [1. alpha. (S*),3.alpha.]-(.alpha.)-cyano-(3-phenoxyphenyl)methyl 3-(2,2-dichloroethenyl)-2.2-dichlorovinyl)-2,2-dimethylcyclopropanecarboxylate (alpha-Cypermethrin), [2,4-Dioxo-(2-propyn-1-yl)imidazolidin-3-yl]methyl(1R)-cis-chrysanthemate;[2,4-Dioxo-(2-propyn-1-yl)imidazolidin-3-yl]methyl(1R)-trans-chrysanthemate (Imiprothrin), 1-(3,5-dichloro-4-(1,1,2,2-tetrafluoroethoxy)phenyl)-3-(2,6-difluorobenzoyl)urea (Hexaflumuron), 1-(4-chlorophenyl)-3-(2,6-difluorobenzoyl)urea, 1-(4-chlorophenyl)-4,4-dimethyl-3-(1,2,4-triazol-1-ylmethyl)pentan-3-ol (Tebuconazole), 1-(4-chlorophenyl)-4,4-dimethyl-3-(1,2,4-triazol-1-ylmethyl)pentan-3-ol (Tebuconazole), 1,2-benzisothiazol-3(2H)-one (BIT), 1,3-bis(hydroxymethyl)-5,5-dimethylimidazolidine-2,4-dione (DMDMH), 1-[[2-(2,4-dichlorophenyl)-4-propyl-1,3-dioxolan-2-yl]methyl]-1H-1, 2,4-triazole (Propiconazole), 1-[2-(allyloxy)-2-(2,4-dichlorophenyl)ethyl]-1H-imidazole (Imazalil), 1-[4-(2- chloro-alpha,alpha,alpha-trifluoro-para-tolyloxy)-2-fluorophenyl]-3-(2,6-difluorobenzoyl)urea (Flufenoxuron), 1-ethynyl-2-methylpent-2-enyl 2,2-dimethyl-3-(2-methylprop-1-enyl)cyclopropanecarboxylate (Empenthrin), 2-(2-butoxyethoxy)ethyl 6-propylpiperonyl ether (Piperonyl butoxide/PBO), 2,2′,2″-(hexahydro-1,3,5-triazine-1,3,5-triyl)triethanol (HHT), 2,2-dibromo-2-cyanoacetamide (DBNPA), 2,2-dimethyl-1,3-benzodioxol-4-yl methylcarbamate (Bendiocarb), 2,2′-dithiobis[N-methylbenzamide] (DTBMA), 2,3,5,6-tetrafluoro-4-(methoxymethyl)benzyl-(1R,3R)-2,2-dimethyl-3-(Z)-(prop-1-enyl)cyclopropanecarboxylate, 2,3,5,6-tetrafluorobenzyl trans-2-(2,2-dichlorovinyl)-3,3-dimethylcyclopropanecarboxylate (Transfluthrin), 2-bromo-2-(bromomethyl)pentanedinitrile (DBDCB), 2-bromo-ethanoic acid, 2-butyl-benzo[d]isothiazol-3-one (BBIT), 2-methyl-1,2-benzothiazol-3(2H)-one (MBIT), 2-methyl-2H-isothiazol-3-one (MIT), 2-methyl-4-oxo-3-(prop-2-ynyl)cyclopent-2-en-1l-yl 2,2-dimethyl-3-(2-methylprop-1-enyl)cyclopropanecarboxylate (Prallethrin), 2-methylbiphenyl-3-ylmethyl (1 RS)-cis-3-[(Z)-2-chloro-3,3,3-trifluoroprop-1-enyl]-2,2-dimethylcyclopropanecarboxylate (Bifenthrin), 2-octyl-2H-isothiazol-3-one (OTT), 2-Phenoxyethanol, 2-Propenoic acid, 2-methyl-, butyl ester, polymer with butyl 2-propenoate and methyl 2-methyl-2-propenoate (CAS nr: 25322-99-0)/Polymeric quaternary ammonium bromide (PQ Polymer), 2-thiazol-4-yl-1H-benzoimidazole (Thiabendazole), 3-(3-biphenyl-4-yl-1,2,3,4-tetrahydro-1-naphthyl)-4-hydroxycoumarin (Difenacoum), 3-(4-isopropylphenyl)-1,1-dimethylurea/Isoproturon, 3-(N-acetyl-N-butyl)aminopropionic acid ethyl ester, 3,3′-methylenebis[5-methyloxazolidine] (Oxazolidin/MBO), 3-[3-(4′-Bromo[1,1′-biphenyl]-4-yl)-3-hydroxy-1-phenylpropyl]-4-hydroxy-2H-1-benzopyran-2-one (Bromadiolone), 3-[3-(4′-bromo[1,1′biphenyl]-4-yl)-1,2,3,4-tetrahydronaphth-1-yl]-4-hydroxy-2H-1-benzothiopyran-2-one (Difethialone), 3-[3-(4′-bromobiphenyl-4-yl)-1,2,3,4-tetrahydro-1-napthyl]-4-hydroxycoumarin (Brodifacoum), 3-iodo-2-propynylbutylcarbamate (IPBC), 3-phenoxybenzyl(1RS,3RS; 1RS,3 SR)-3-(2,2-dichlorovinyl)-2,2-dimethylcyclopropanecarboxylate (Permethrin), 3-phenoxybenzyl(1R,3R)-2,2-dimethyl-3-(2-methylprop-1-enyl)cyclopropanecarboxylate (1R-trans-Phenothrin), 3-phenoxybenzyl-2-(4-ethoxyphenyl)-2-methylpropylether, 4,5-Dichloro-2-octylisothiazol-3(2H)-one (DCOIT)), 4-bromo-2-(4-chlorophenyl)-1-ethoxymethyl-5-trifluoromethylpyrrole-3-carbonitrile (Chlorfenapyr), 4-bromo-2-(4-chlorophenyl)-5-(trifluoromethyl)-1H-pyrrole-3-carbonitrile (Tralopyril), 4-hydroxy-3-[(1RS,3RS;1RS,3RS)-1,2,3,4-tetrahydro-3-[4-(4-trifluoromethylbenzyloxy)phenyl]-1-naphthyl]coumarin (Flocoumafen), 4-phenoxyphenyl (RS)-2-(2-pyridyloxy) propyl ether (Pyriproxyfen), 5-chloro-2-(4-chlorphenoxy) phenol (DCPP), 5-Chloro-2-methyl-2H-isothiazol-3-one (CIT), 6-(phthalimido)peroxyhexanoic acid (PAP), 7a-ethyldihydro-1H,3H,5H-oxazolo[3,4-c]oxazole (EDHO), Abamectin as a mixture of avermectin B1a (EINECS 265-610-3) and avermectin B1b (EINECS 265-611-9), Acrylaldehyde, Alkyl dimethylbenzyl ammonium chloride, Allyl isothiocyanate, alpha-bromadiolone, Aluminium phosphide, Amines, C10-16-alkyldimethyl, N-oxides, Amines, N-C10-16-alkyltrimethylenedi-, reaction products with chloroacetic acid (Ampholyt 20), Benzoic acid, Biphenyl-2-ol, Bis(1-hydroxy-1H-pyridine-2-thionato-O,S)copper (Copper pyrithione), bis(N-cyclohexyl-diazenium-dioxy)-copper, Boric acid, Bromide activated chloramine (BAC), Bromochloro-5,5-dimethylimidazolidine-2,4-dione (BCDMH/Bromochlorodimethylhydantoin), Bronopol, Calcium dihydroxide/calcium hydroxide/caustic lime/hydrated lime/slaked lime, Calcium magnesium oxide/dolomitic lime, Calcium magnesium tetrahydroxide/calcium magnesium hydroxide/hydrated dolomitic lime, Calcium oxide/lime/burnt lime/quicklime, Carbendazim, Carbon dioxide, Cetylpyridinium chloride, Chlorine dioxide, Chlorine dioxide generated from Tetrachlorodecaoxide complex (TCDO) by acidification (Redefined from Tetrachlorodecaoxide complex (TCDO)), Chlorocresol, Chlorophacinone, *Chrysanthemum cinerariaefolium*, Cinnamaldehyde/3-phenyl-propen-2-al (Cinnamic aldehyde), cis-1-(3-chloroallyl)-3,5,7-triaza-1-azoniaadamantane chloride (cis CTAC), cis-Tricos-9-ene, (Z)-Tricos-9-ene, Citric acid, Clorophene (Chlorophene), Coco alkyltrimethylammonium chloride (ATMAC/TMAC), Copper, Copper (II) hydroxide, Copper (II) oxide, Copper sulphate pentahydrate, Copper thiocyanate, Copper(II) carbonate-copper(II) hydroxide (1:1), Coumatetralyl, Creosote, Cyanamide, Cyclohexylhydroxydiazene 1-oxide, potassium salt, D-gluconic acid, compound with N,N‴-bis(4-chlorophenyl)-3,12-diimino-2,4,11,13-tetraazatetradecanediamidine (2:1) (CHDG), Diboron trioxide, Dichloro-N-[(dimethylamino)sulphonyl]fluoro-N-(ptolyl)methanesulphenamide (Tolylfluanid), Dicopper oxide, Didecyldimethylammonium chloride (DDAC (C8-10)), Dimethyloctadecyl[3-(trimethoxysilyl)propyl]ammonium chloride, Dinotefuran, Disodium octaborate tetrahydrate, Disodium peroxodisulphate/Sodium persulphate, Disodium tetraborate, anhydrous, Disodium tetraborate, decahydrate, Disodium tetraborate, pentahydrate, Diuron, Dodecylguanidine monohydrochloride, epsilon-Momfluorothrin, Ethanol, Ethyl [2-(4-phenoxyphenoxy)ethyl]carbamate (Fenoxycarb), Ethylene oxide, "*Eucalyptus citriodora* oil, hydrated, cyclized (EC Oil (H/C)), Fludioxonil, Formaldehyde, Formic acid, Geraniol, Glutaral (Glutaraldehyde), Glycollic acid, Glyoxal, Granulated copper, Hexa-2,4-dienoic acid (Sorbic acid), Hydrochloric acid, Hydrogen cyanide, Hydrogen peroxide, Iodine/Polyvinylpyrrolidone iodine, Isopropyl-(2E,4E,7S)-11-methoxy-3,7,11-trimethyl-2,4-dodecadienoate, L-(+)-lactic acid, Lauric acid, Lavender, *Lavandula hybrida*, ext./Lavandin oil, Magnesium monoperoxyphthalate hexahydrate (MMPP), Margosa extract, Mecetronium ethyl sulphate (MES), Medetomidine, Metamsodium, Methenamine 3-chloroallylochloride (CTAC), methyl(E)-2-{ } {2-[6-(2-cyanophenoxy)pyrimidin-4-yloxy]phenyl}}-3-methoxyacrylate (Azoxystrobin), Methylene dithiocyanate, Mixture of 5-chloro-2-methyl-2H-isothiazol-3-one (EINECS 247-500-7) and 2-methyl-2H-isothiazol-3-one (EINECS 220-239-6) (Mixture of CMIT/MIT), Monochloramine, Monolinuron, N-((6-Chloro-3-pyridinyl)methyl)-N′-cyano-N-methylethanimidamide (Acetamiprid), N-(3-aminopropyl)-N-dodecylpropane-1,3-diamine (Diamine), N-(Dichlorofluoromethylthio)-N′,N′-dimethyl-N-phenylsulfamide (Dichlofluanid), N-(trichloromethylthio)phthalimide (Folpet), N,N-diethyl-m-toluamide (DEET), N,N′-methylenebismorpholine (MBM), N-cyclopropyl-1,3,5-triazine-2,4,6-triamine (Cyromazine), n-Decanoic acid, N-Didecyl-N-dipolyethoxyammonium borate/Didecylpolyoxethylammonium borate (Polymeric betaine), Nitrogen, n-Octanoic acid, Nonanoic acid, Ozone generated from oxygen, p-[(diiodomethyl)sulphonyl]toluene, Penflufen, Pentapotassium bis(peroxymonosulphate)bis(sulphate), Peracetic acid, Potassium (E,E)-hexa-2,4-dienoate (Potassium Sorbate), Potassium 2-biphenylate, Potassium dimethyldithiocarbamate, Propan-1-ol, Propan-2-ol, Pyrithione-2-thiol 1-oxide, sodium salt (Sodium pyrithione), Pyrithione zinc (Zinc pyrithione), *Pythium oligandrum*, Chromista-Stramenopila, Quaternary ammonium compounds, S-[(6-chloro-2-oxooxazolo[4,5-b]pyridin-3(2H)-yl)methyl]

O,O-dimethyl thiophosphate (Azamethiphos), Salicylic acid, sec-butyl 2-(2-hydroxyethyl)piperidine-1-carboxylate/ Icaridine (Icaridine), Silicium dioxide, Silver, Silver copper zeolite, Silver nitrate, Silver phosphate glass, Silver sodium hydrogen zirconium phosphate, Silver zeolite, Silver zinc zeolite, Sodium 2-biphenylate, Sodium Azide, Sodium dichloroisocyanurate dehydrate, Sodium dimethylarsinate (Sodium Cacodylate), Sodium dimethyldithiocarbamate, Sodium metabisulfite, Sodium N-(hydroxymethyl)glycinate, Sodium N-chlorobenzenesulphonamide (Chloramine-B), Sodium p-chloro-m-cresolate, Sodium 2-oxo-3-(3-oxo-1-phenylbutyl)chromen-4-olate (Warfarin sodium), Spinosad, Sulphur dioxide, Sulphuryl difluoride, Symclosene, Terbutryn, Tetrahydro-1,3,4,6-tetrakis(hydroxymethyl)imidazo[4,5-d]imidazole-2,5(1H,3H)-dione (TMAD), Tetrahydro-3,5-dimethyl-1,3,5-thiadiazine-2-thione (Dazomet), Tetrakis(hydroxymethyl)phosphonium sulphate(2:1) (THPS), Tetramethrin, Thiamethoxam, Thiram, Tosylchloramide sodium (Tosylchloramide sodium-Chloramin T), Trimagnesium diphosphide, Troclosene sodium, Undecan-2-one, Willaertia magna c2c Maky, Zinc ethylenebis(dithiocarbamate) (polymeric), Zinc ethylenebis(dithiocarbamate) (polymeric), combinations thereof, and the like.

4. Surfactant

In one embodiment of the present technology, the composition can include at least one anionic, non-ionic or amphoteric surfactant, to stabilize the latex emulsion and to improve the mechanical stability of the composition. Surfactants are compounds that lower the surface tension (or interfacial tension) between two liquids, between a gas and a liquid, or between a liquid and a solid. Surfactants may act as detergents, wetting agents, emulsifiers, foaming agents, and dispersants.

Stable non-ionic surfactants include polyethylene oxide condensates of alkyl phenol, polyoxyalkylene derivatives of propylene glycol, ethylene oxide and the reaction product of propylene oxide and ethylene diamine, ethylene oxide condensates of aliphatic alcohols, long chain tertiary Stine oxides, long chain tertiary phosphine oxides, long chain dialkyl sulfoxides and the like.

An example of surfactant that can be utilized in the present technology is Octylphenol Ethoxylate (Triton™ X-405) by Dow, which is a nonionic surfactant.

Optionally examples of surfactants that can be utilized in the present technology include, but not limited to, Triton™ X surfactants, polyoxyethylene alkyl ether, polyoxyethylene alkyl phenol ether, polyoxyethylene-polyoxypropylene block polymers, polyoxyethylene fatty acid esters, polyoxyethylene sorbitan fatty acid esters, alkyl sulfuric acid ester salts, alkyl benzenesulfonic acid salts, alkyl sulfosuccinic acid salts, alkyl diphenyl ether disulfonic acid salts, polyoxyethylene alkyl sulfuric acid salts, polyoxyethylene alkyl phosphoric acid salts, FC-430 Fluoro surfactant by 3M, IGEPAL CO-630 by Rhone-Poulenc, MAZON® SAM 181, 183, 184, 211 by PPG Industries, Inc., NIOGEN RN, AQUARON or HITENOL by Daiichi Kogyo Seiyaku, TREM LF-40 by Henkel, alkyl polyglycol ethers such as ethoxylation products of lauryl, oleyl, and stearyl alcohols; alkyl phenol polyglycol ethers such as ethoxylation products of octyl- or nonylphenol, diisopropyl phenol, and triisopropyl phenol, TERGITOL 15-S-40 and TERGITOL NP-40 available from Union Carbide, alkali metal or ammonium salts of alkyl, aryl or alkylaryl sulfonates, sulfates, phosphates, and the like, sodium lauryl sulfate, sodium octylphenol glycolether sulfate, sodium dodecylbenzene sulfonate, sodium lauryldiglycol sulfate, and ammonium tritertiary-butyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like, AEROSOL 18 and AEROSOL OT-75 from Cytech, combinations thereof, and the like.

5. Freeze Thaw Stabilizer

In one embodiment of the present technology, the composition can include at least one freeze thaw stabilizer/agent to depress the freezing point of the composition. Freeze-thaw agents depress the freezing point of a liquid by increasing the resistance to freezing. On thawing, the various volatile components reach maximum solubility at different times. The protective colloid will re-dissolve in the melting ice at different rates. If the cold flow occurs to the polymer particles before the protective agents become effective again, the system will remain in a flocculated or coagulated condition. The effective means of promoting freeze-thaw resistance also decreases the composition's over-all water resistance. Depressing the freezing point of the composition does increase the resistance to freezing by the discriminate use of the freeze thaw agent.

An example of surfactant that can be utilized in the present technology is propylene glycol ($C_3H_8O_2$). Other names of propylene glycol can include propane-1,2-diol, α-Propylene glycol, 1,2-Propanediol, 1,2-Dihydroxypropane, Methyl ethyl glycol (MEG), and Methylethylene glycol. Propylene glycol is a synthetic organic compound, and chemically it is classed as a diol and is miscible with a broad range of solvents, including water, acetone, and chloroform.

Optionally examples of freeze thaw agents that can be utilized in the present technology include, but not limited to, alcohols, ethylene glycol, glycol, ethers, prolyoxyethylated non-ionic, combinations thereof, and the like.

5. Dispersing Aids

In one embodiment of the present technology, the composition can include at least one dispersing aid or dispersant to improve the separation of particles and to prevent settling or clumping. Dispersing aids are used to assist the mechanical process of dispersing solid, insoluble pigments in a composition. These dispersing aids are mostly polymeric substances that dissociate into ions in aqueous media.

Examples of dispersing aids that can be utilized in the present technology are potassium tripolyphosphate (KTPP) or Tetrapotassium pyrophosphate (TKPP) by Airedale Chemical Company.

Optionally examples of dispersing aids that can be utilized in the present technology include, but not limited to, polyphosphates, polyacrylates, Sodium polyphosphates, CALGON® N, CALGON® 322, CALGON® 322, Potassium phosphate, CALGON® TK, Phosphonate, LOPON® P, LOPON® W, LOPON® PO, Sodium-Polyacrylate, LOPON® LF, LOPON® 800, LOPON® 890, Potassium-Polyacrylate, LOPON® 895, Ammonium-Polyacrylate, LOPON 885, Polyurethanes, combinations thereof, and the like.

6. Enzymatic Hydrolysate Peptone

In one embodiment of the present technology, the composition can include at least one peptone or enzymatic hydrolysate, or at least one additive derived from a peptone or an enzymatic hydrolysate peptone. Peptones are hydrolyzed proteins formed by enzymatic or acidic digestions, and are a source of nitrogen for chemical components.

The peptone or additive derived therefrom, utilized in the present technology is sufficient or capable of providing the sealant with the means to prevent the water from freezing down to approximately −20° C. An example of an enzymatic hydrolysate peptone that can be utilized in the present technology is a collagen protein or peptide, gelatine hydrolysate enzymatic or Peptiplus® manufactured by Gelita.

Collagen peptides are short chain protein building blocks produced by hydrolysis of native collagen. Depending on the applied enzymatic process, a characteristic pattern of collagenic fragments will be generated. Collagen peptides are a pure source of protein that originates from collagen, a mammalian extracellular matrix protein. Some properties of collagen protein or peptide, gelatine hydrolysate enzymatic or Peptiplus® is that they provide excellent solubility in cold water, low viscosity even at high concentrations and excellent clarity without any precipitation in liquids, are non-allergenic, easily digestible, heat-stability, stable against food acids, brilliant clarity, no precipitation or flocculation in liquid applications, neutral in taste and odor, and are compatible with most ingredients and can be easily blended with vitamins, minerals, trace elements or single amino acids.

Optionally examples of peptones that can be utilized in the present technology include, but not limited to, Acidast™ Peptone, Bacto Casitone, Bacto Petamin, Bacto Peptone, Bacto Proteose Peptone, Bacto Soytone, Bacto Tryptone, Bacto Triplets, Biosate™ Peptone, Casein Hydrolysate, Gelatone, Gelysate™ Peptone, HiVeg Peptone, HiVeg Peptone No. 1-5, HiVeg Peptone B, HiVeg Peptone C, HiVeg Special Peptone, Lactoalbumin Hydrolysate, Liver Digest Neutralized, Mycological Peptone, Myosate™ Peptone, Neopeptone, Peptone Bacteriological Neutralized, Peptone P, Peptonized Milk, Phytone™ Peptone, Polypeptone™ Peptone, Proteose Peptone, Proteose Peptone No. 2 or 3, Soy Peptone (Soya Peptone), Soytone, Special Peptone, Thiotone™ E Peptone, Trypticase™ Peptone, Tryptone, Tryptone T, Tryptose, combinations thereof, and the like.

7. Pigment

In one embodiment of the present technology, the composition can include at least one pigment to provide color to the composition.

Examples of pigments that can be utilized in the present technology are TIOXIDE® TR-93 (Rutile Titanium dioxide) by Huntsman and/or W-7016 Black (Carbon Black) supplied by BASF (Aurasperse®). It can be appreciated that a variety and/or combination of pigments can be utilized with the present technology composition to create a desired color.

Optional examples of pigments that can be utilized in the present technology include, but not limited to, iron oxide, titanium dioxide, chromium oxide, combinations thereof, and the like.

8. Dispersing Agent

In one embodiment of the present technology, the composition can include at least one dispersing agent to improve the separation of particles and to prevent settling or clumping. Dispersing agents can be used in association with pigments, dyes or colorants to prevent flocculation.

An example of a dispersing agent that can be utilized in the present technology is Tamol™ by Dow. For example, Tamol™ 851 is a polyacid pigment dispersant that is both ammonia- and formaldehyde-free. It can be appreciated that other dispersing agents can be used in place of Tamol™.

8. Filler

In one embodiment of the present technology, the composition can include at least one filler to lower the consumption of more expensive binder material or to better some properties of the mixtured material.

An example of a filler that can be utilized in the present technology is Drikalite® by Imerys Carbonates, which is a fine particle size, dry ground marble.

Optional examples of fillers that can be utilized in the present technology include, but not limited to, Barium Sulfate (Barytes), Bentonite, BARA, Bariace, Barifine, Barimite, Barimite #22 Barytes, Barimite 200, Barimite G-50, Barimite UF, Barimite XF, Cimbar 325, Cimbar CF, Cimbar EX, Cimbar PC, Cimbar UF, Cimbar XF, Polywate, Suspengel, Calcium Carbonates, #8 White, #10 White, 30-50 White, 40-200, Atomite, Calwhite, Camel-Cal, Camel-Fil, Camel-Fine, Camel-Wite, CC-103, CP Filler, Duramite, Gamaco, Gamasperse, Kotamite, Marblemite, Mar'Blend, Micro-White, OZ White, RO-40, Snowflake PE, Supercoat, Supermite, XO White, Z White, Water-washed, Delaminated, Calcined, Air-floated Kaolin Clays, Ajax, Altowhite, Glomax, Hydrite, Kaopaque, Neogen, Polestar, 6 tile clay, Talcs, Chlorites, Artic Mist, Cimpact, Jetfil, Mistron, Nicron, Olympic H, Sierralite, Silverline, Stellar, Supreme H, TC-100, Techfil, Vertal, Yellowstone, fibre flocks, PAN, ARSELON, KEV, RM, PEt, WN, CD, PP, PE, Primafloc, Novafloc, Arselon, Clibond, CilRelease, combinations thereof, and the like.

9. Thickener

In one embodiment of the present technology, the composition can include at least one thickener to thicken "in-situ" the composition to a desired viscosity.

An example of a thickener that can be utilized in the present technology are sodium polyacrylate thickeners, such as but not limited to, Paragum® 500 by Starch Parachem. Paragum® 500 is an Alkali swellable polyacrylate, which rapidly convert to flowable viscous solutions when diluted and neutralized with an appropriate base such as ammonium hydroxide or caustic.

Optional examples of thickeners that can be utilized in the present technology include, but not limited to, Paragum® 511, Paragum® 109, Paragum® 525, Paragum® 530, Paragum® 600, Paragum® 601, Paragum® T-111, Paragum® 184, Paragum® 241, Paragum® 341, Paragum® 247, Paragum® 288, Paragum® 390, Paragum® 277, Paragum® AM-12, Sodium Polyacrylates, Paracare HD-LC, Paramide LAM, Stanfax® 1000F, combinations thereof, and the like.

The aforementioned preparation can be used to prepare the present technology composition, which can include:
at least one latex polymer;
at least one freeze thaw stabilizer; and
at least one peptone or at least one additive derived from a peptone.

The ratio of above-described compounds will depend on the relation to other compounds selected; the final application for the sealant; and/or the cured sealant properties desired for that application. Specific physical properties required for the sealant composition will depend on application. For example, sealant composition viscosity can be formulated for application method, application temperature, and/or desired cycle time.

The following example(s) is included for purposes of illustration so that the disclosure may be more readily understood and are in no way intended to limit the scope of the disclosure unless otherwise specifically indicated.

Example 1

The aforementioned ingredients can be used to prepare the present technology sealant composition:
at least one defoamer;
at least one latex polymer;
at least one biocide;
at least one surfactant;
at least one freeze thaw stabilizer;

at least one dispersing aid;
at least one collagen protein or peptide, or at least one additive derived from a collagen protein or peptide;
at least one pigment;
at least one filler; and
at least one thickener.

Example 2

The aforementioned ingredients were used to prepare the present technology sealant composition. The amount of each component in each sample is shown in general weight percent in Table 1 below:

TABLE 1

| Defoamer | HL-52 | 0.1 |
|---|---|---|
| Low Tg Latex Polymer | Rhoplex ™ 4400 | 38.1 |
| Biocide | Mergal ® 758 | 0.05 |
| Biocide | Polyphase ® 678 | 0.15 |
| Surfactant | Triton ™ x405 | 1 |
| Freeze Thaw Stabilizer | Propylene Glycol | 5 |
| Dispersing aid | KTPP | 0.05 |
| Enzymatic hydrolysate peptone | Peptiplus ® | 0.25 |
| Pigment | TR-93 | 0.455 |
| Pigment | W-7016 Black | 0.04 |
| Dispersing agent | Tamol ™ 851 | 1 |
| Filler | Drikalite ® | 52.105 |
| Thickener | Paragum ® 500 | 1.7 |

Preparation of the present technology sealant composition can include:

1) Prepare all liquids prior to charging/introducing by mixing, stirring or agitating until no solids remain.
2) Mix all compounds until uniform.
3) Discharge mixed composition into storage container.

While embodiments of the wide temperature water borne sealant have been described in detail, it should be apparent that modifications and variations thereto are possible, all of which fall within the true spirit and scope of the present technology. With respect to the above description then, it is to be realized that the optimum dimensional relationships for the parts of the present technology, to include variations in amount, proportions, function and manner of operation, are deemed readily apparent and obvious to one skilled in the art, and all equivalent relationships to those described in the specification are intended to be encompassed by the present technology. For example, any suitable replaceable compound, composition and/or ingredient may be used instead of the above described.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected is as follows:

1. A latex sealant composition comprising:
   at least one latex polymer;
   at least one freeze thaw stabilizer; and
   at least one peptone or at least one additive derived from a peptone, said peptone being an enzymatic hydrolysate.
2. The composition of claim 1, wherein said latex polymer is an acrylic latex polymer with a Glass Transition Temperature (Tg) of below 1° C.
3. The composition of claim 1, wherein said freeze thaw stabilizer is a diol.
4. The composition of claim 1, wherein said freeze thaw stabilizer is propylene glycol.
5. The composition of claim 1 further comprises at least one defoamer.
6. The composition of claim 5, wherein said defoamer is water-based and non-silicone antifoam agent.
7. The composition of claim 1 further comprises at least one biocide.
8. The composition of claim 1 further comprises at least one surfactant.
9. The composition of claim 8, wherein said surfactant is nonionic.
10. The composition of claim 8, wherein said surfactant is octylphenol ethoxylate.
11. The composition of claim 1 further comprises at least one dispersing aid.
12. The composition of claim 11, wherein said dispersing aid is tripolyphosphate or tetrapotassium pyrophosphate.
13. The composition of claim 1 further comprises at least one pigment.
14. The composition of claim 1 further comprises at least one dispersing agent.
15. The composition of claim 14, wherein said dispersing agent is a polyacid pigment dispersant.
16. The composition of claim 1 further comprises at least one filler.
17. The composition of claim 16, wherein said filler is ground marble.
18. The composition of claim 1 further comprises at least one thickener.
19. The composition of claim 18, wherein said thickener is a polyacrylate thickener.
20. A method of using said latex sealant composition of claim 1, said method including the step of applying said latex sealant composition for applications that require flexibility at temperatures below 0° C.

* * * * *